(12) United States Patent
Duchaine et al.

(10) Patent No.: US 11,732,893 B2
(45) Date of Patent: Aug. 22, 2023

(54) DEVICE FOR SUPPLYING FUEL TO A COMBUSTION CHAMBER OF A GAS GENERATOR

(71) Applicant: SAFRAN HELICOPTER ENGINES, Bordes (FR)

(72) Inventors: Patrick Olivier Duchaine, Moissy-Cramayel (FR); Guillaume Thierry Cottin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/779,056

(22) PCT Filed: Nov. 20, 2020

(86) PCT No.: PCT/FR2020/052146
§ 371 (c)(1),
(2) Date: May 23, 2022

(87) PCT Pub. No.: WO2021/099752
PCT Pub. Date: May 27, 2021

(65) Prior Publication Data
US 2022/0412562 A1    Dec. 29, 2022

(30) Foreign Application Priority Data
Nov. 22, 2019   (FR) ........................... 1913112

(51) Int. Cl.
*F23R 3/38*     (2006.01)
*F02C 7/22*     (2006.01)
*F23R 3/28*     (2006.01)

(52) U.S. Cl.
CPC ................ *F23R 3/38* (2013.01); *F02C 7/222* (2013.01); *F23R 3/283* (2013.01)

(58) Field of Classification Search
CPC ............... F23R 3/38; F23R 3/28; F23R 3/283
See application file for complete search history.

(56) References Cited

U.S. PATENT DOCUMENTS 2,856,755 A    10/1958   Szydlowski
3,018,625 A *   1/1962   Bachle ..................... F23R 3/38
                                                      60/745

(Continued)

FOREIGN PATENT DOCUMENTS

DE       1162136 B         1/1964
GB        955150 A         4/1964
WO   WO 2015036703 A1      3/2015

OTHER PUBLICATIONS

International Patent Application No. PCT/FR2020!052146, International Search Report and Written Opinion dated Feb. 16, 2021, 7 pgs.

(Continued)

*Primary Examiner* — William H Rodriguez
(74) *Attorney, Agent, or Firm* — Cozen O'Connor

(57) ABSTRACT

A device for supplying fuel to a combustion chamber of a gas generator includes an injection wheel (14) for injecting fuel into the combustion chamber (18),—a fuel supply rail (20) including an internal fuel circuit (30) with a fuel outlet means (32) supplying fuel to an annular spray chamber (24) formed between the rail (28, 44, 48, 52, 56) and the injection wheel (14),—at least one dynamic annular seal (26) adapted to provide a seal between an annular face (34) of the fuel supply rail (28, 44, 48, 52, 56) and the injection wheel (14), wherein the internal fuel circuit (30) of the fuel supply rail includes an annular fuel flow part arranged radially at the dynamic annular seal (26).

15 Claims, 4 Drawing Sheets

(56) References Cited

U.S. PATENT DOCUMENTS

| | | | | |
|---|---|---|---|---|
| 4,038,815 A * | 8/1977 | Heitmann | ................. | F23R 3/38 |
| | | | | 60/726 |
| 4,040,251 A * | 8/1977 | Heitmann | ................. | F02C 7/36 |
| | | | | 60/804 |
| 4,193,260 A * | 3/1980 | Carlisle | ................... | F23R 3/045 |
| | | | | 60/737 |
| 4,232,526 A * | 11/1980 | Barbeau | ................... | F23R 3/38 |
| | | | | 60/745 |
| 4,257,236 A * | 3/1981 | Morishita | ................. | F23R 3/38 |
| | | | | 60/745 |
| 4,870,825 A * | 10/1989 | Chapman | .................. | F23R 3/38 |
| | | | | 60/745 |
| 5,323,602 A * | 6/1994 | Defever | ................. | F23R 3/002 |
| | | | | 60/755 |
| 7,762,072 B2 * | 7/2010 | Critchley | ................. | F23R 3/38 |
| | | | | 60/752 |
| 2008/0184707 A1 * | 8/2008 | Zupanc | .................... | F23R 3/38 |
| | | | | 431/168 |
| 2018/0003388 A1 * | 1/2018 | Park | ......................... | F23R 3/04 |

OTHER PUBLICATIONS

French Patent Application No. 1913112; Search Report dated Aug. 13, 2020; 8 pgs.

\* cited by examiner

[Fig. 1]
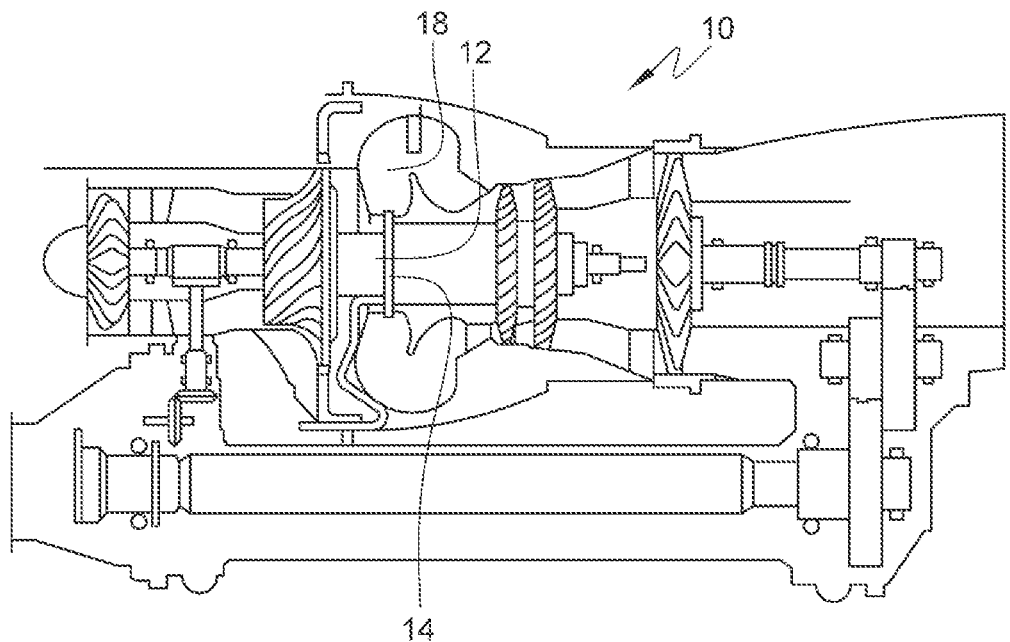
[Fig. 2]
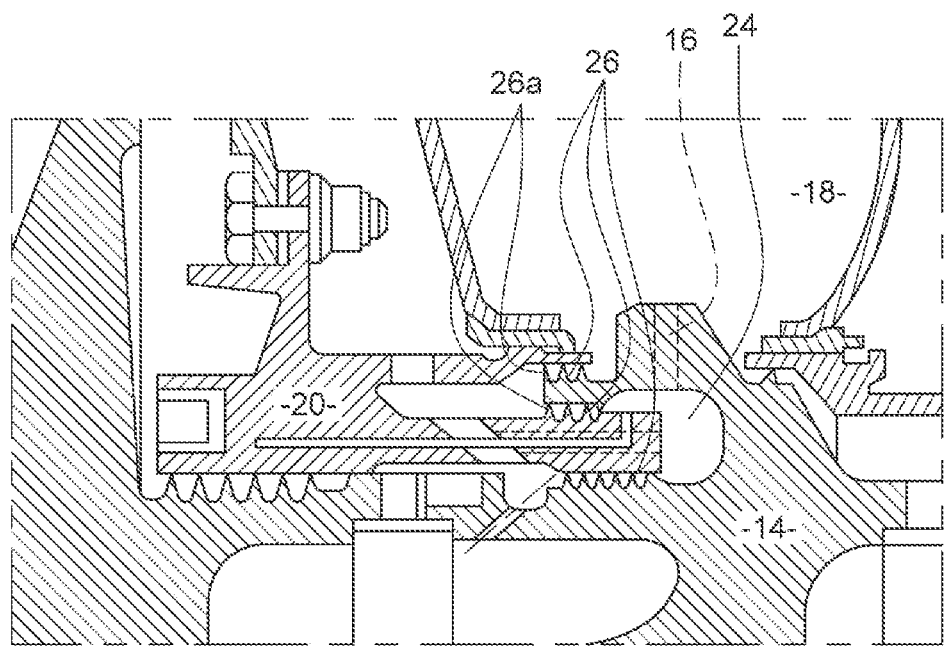

[Fig. 3]
A
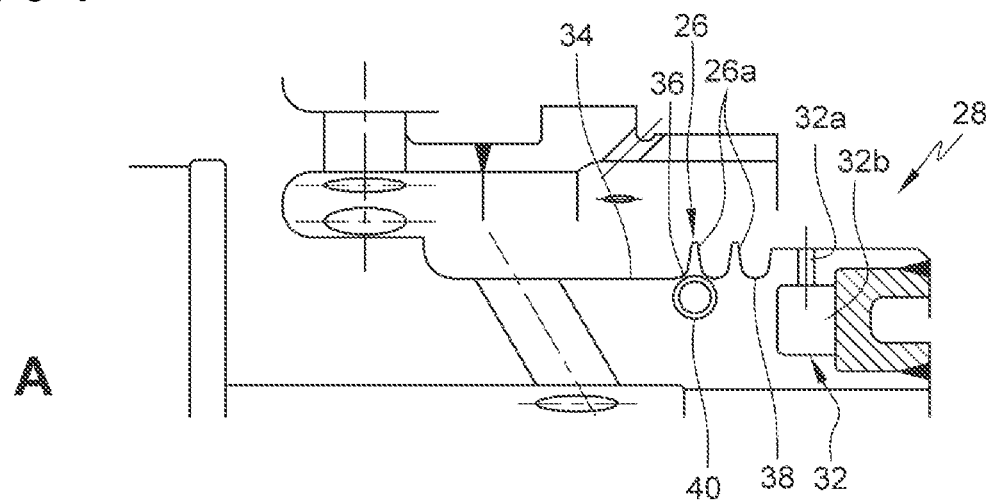
B
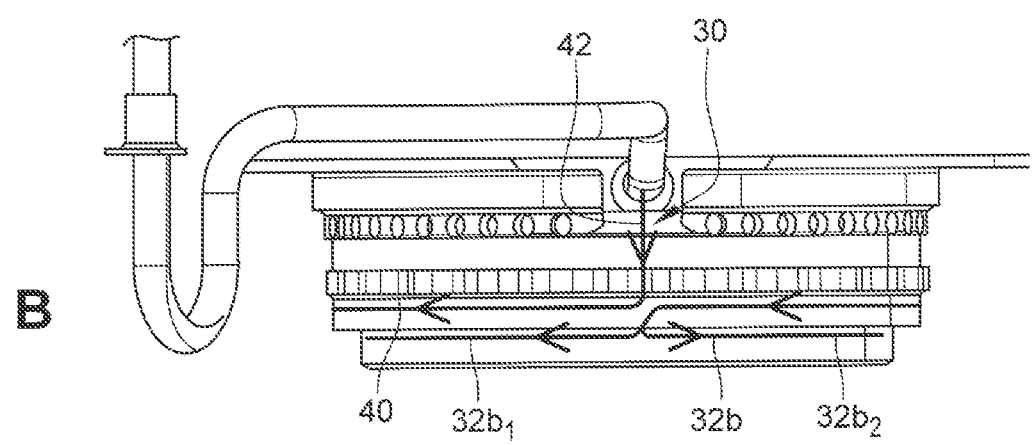
[Fig. 4]
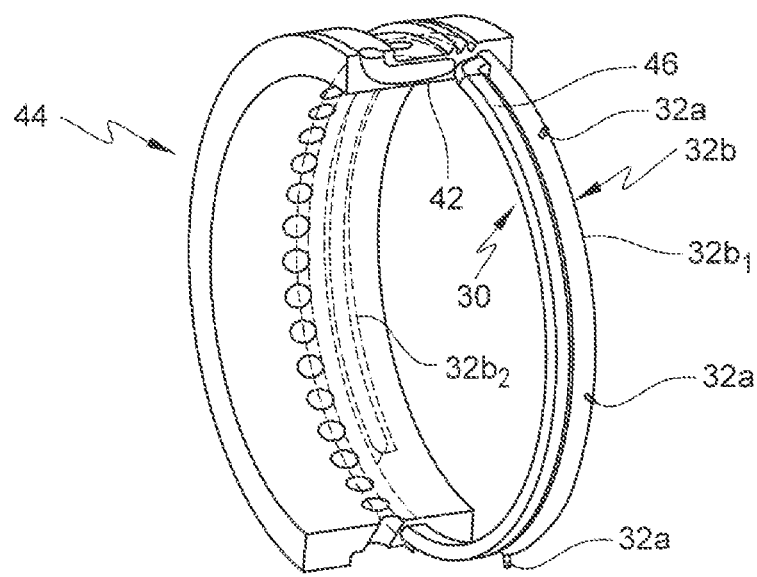

[Fig. 5]
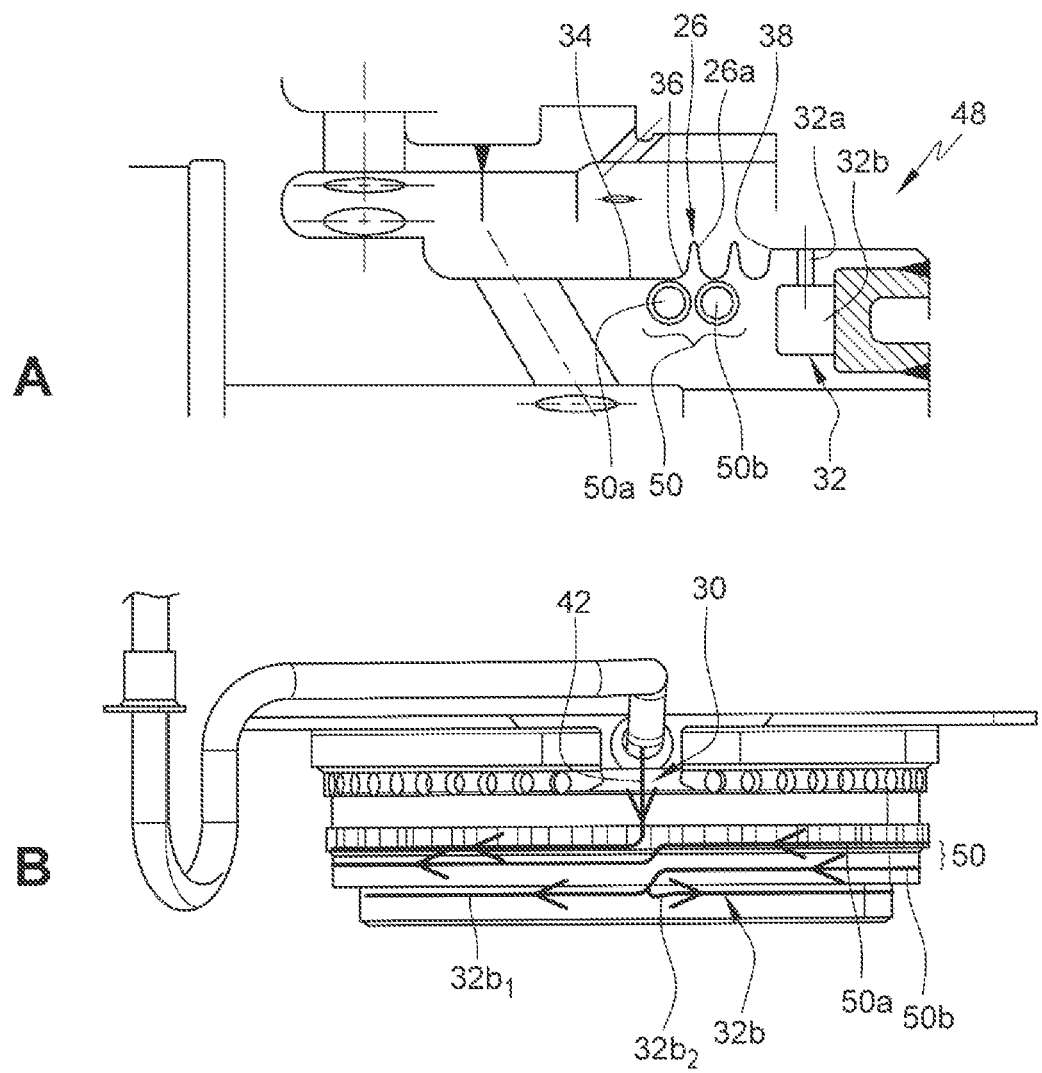

[Fig. 6]
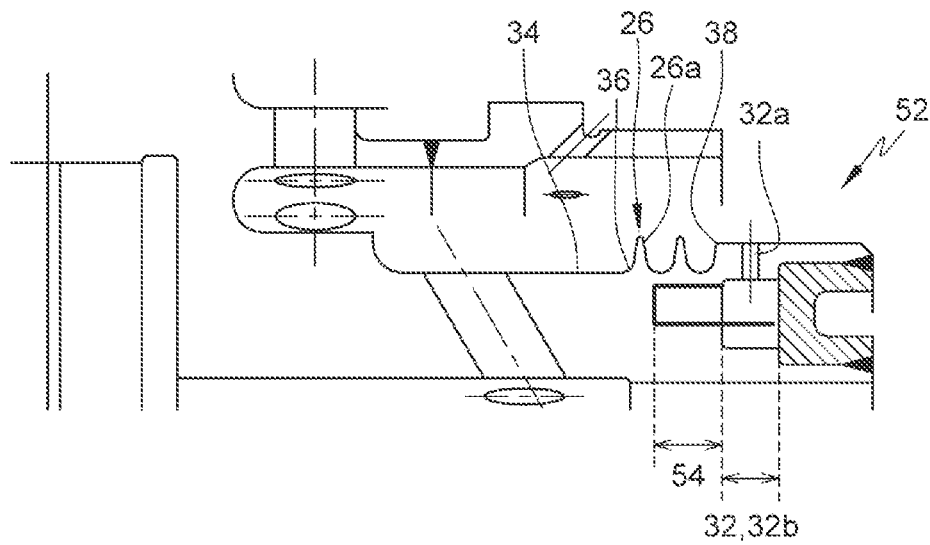
[Fig. 7]
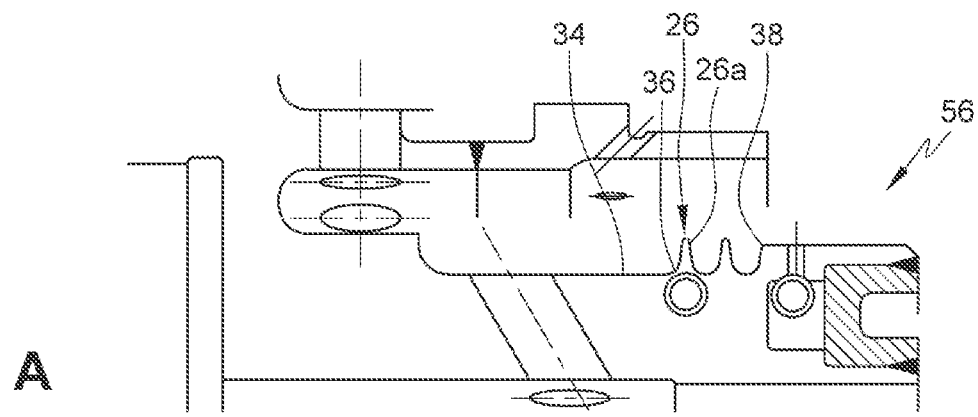
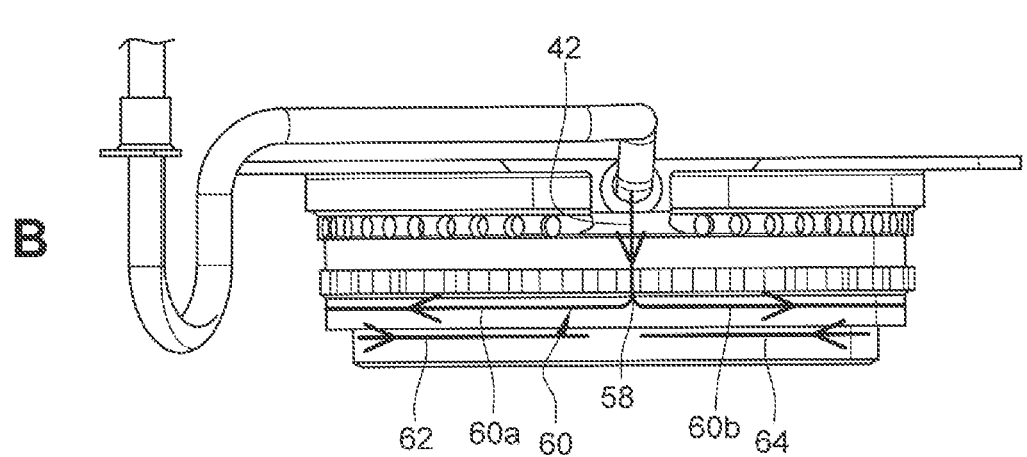

DEVICE FOR SUPPLYING FUEL TO A COMBUSTION CHAMBER OF A GAS GENERATOR

CROSS-REFERENCE TO RELATED APPLICATIONS

This application is a 35 U.S.C. § 371 filing of International Application No. PCT/FR2020/052146 filed Nov. 20, 2020, which claims the benefit of priority to French Patent Application No. 1913112 filed Nov. 22, 2019, which is incorporated herein by reference in its entirety.

TECHNICAL FIELD

The field is that of fuel injection devices in a combustion chamber of an engine for an aircraft.

BACKGROUND

With reference to FIG. 1, some turbomachines 1, such as turbo engines, comprise a gas generator 10 comprising a rotating shaft 12 on which is mounted an injection wheel 14, which is therefore itself rotatable.

The injection wheel has a plurality of orifices 16 which open into a combustion chamber 18. In this way the injection wheel, as it rotates, sprays fuel centrifugally into the combustion chamber 18. With reference to FIG. 2, the turbomachine also includes a fuel supply rail 20, which is a fixed part having a revolution shape mounted around the shaft 12 of the gas generator 10. The fuel supply rail 20 delivers fuel to the injection wheel. Thus, the fuel supply rail 20 comprises an internal fuel circuit which opens into a cavity or an annular spray chamber 24. To ensure sealing between the injection wheel 14 and the fuel supply rail 20, a plurality of dynamic annular seals 26 such as labyrinth seals are provided. This type of dynamic annular seal 26, well known in the state of the art, comprises annular teeth 26a carried by one of the fuel supply rail 20 and the injection wheel 14 and rubbing on an abradable annular part of the other of the injection wheel 14 and the fuel supply rail 20.

However, it often happens that a solid deposit of coke forms between the annular teeth 26a, thus causing friction between the injection wheel 14 and the fuel supply rail 20. Friction can increase until the gas generator shaft is completely blocked and the engine cannot be started.

In the event of start-up difficulties, operators perform troubleshooting operations described in the turbomachinery maintenance manual. These investigations are generally long and not very effective, as it can take a long time to detect the cause of the start-up difficulties, in this case coking in the dynamic joints (indeed, many other causes are possible). Once the cause has been identified, either the rail on the engine is cleaned or the rail is removed for cleaning or replacement. These operations imply an unforeseen unavailability of the turbomachine, and therefore of the aircraft in which it is installed, which may furthermore require the cancellation of one or more planned flight missions. These operations therefore represent a significant cost.

It is therefore important to limit the formation of coke in the dynamic annular seals providing a seal Between the injection wheel and the fuel supply rail.

The invention aims to remedy these drawbacks in a simple, reliable and inexpensive way.

SUMMARY

Thus, the present document relates to a device for supplying fuel to a combustion chamber of a gas generator, comprising:
- a fuel injection wheel for injecting fuel into the combustion chamber,
- a fuel supply rail comprising an internal fuel circuit with fuel outlet means supplying fuel to an annular spray chamber formed between the rail and the injection wheel,
- at least one dynamic annular seal adapted to provide a seal between an annular face of the fuel supply rail and the injection wheel, Characterised in that the internal fuel circuit of the fuel supply rail comprises an annular fuel flow part arranged radially at the dynamic annular seal.

Unlike the prior art, the internal fuel circuit is provided with an annular part which is arranged right at the dynamic annular seal, which allows the temperature (typically below 150° C.) to be lowered by fuel circulation at the dynamic annular seal and thus prevents the formation of coke. When the seal comprises annular teeth, coke accumulation in the annular spaces formed between the annular teeth is prevented. The nominal operating conditions of the turbo machine can thus be maintained, as there is no risk of the motor shaft blockage. The term "annular part" does not refer to a 360° shaped part as will become apparent from the detailed description.

In one embodiment, said annular part comprises at least a first turn arranged radially inside the dynamic seal and connected downstream to the fuel outlet means. This first turn has an upstream end connected to an upstream fuel channel and is connected downstream to the fuel outlet means.

Also, said first turn may be formed in the vicinity of a first axial end of the dynamic seal, said first axial end being arranged along the seal opposite to a second end arranged in the vicinity of the fuel outlet means. This positioning of the first turn allows the first end of the dynamic annular seal, which is the part most prone to coke formation, to cool.

Furthermore, said annular part may comprise at least one second turn arranged axially between the first turn and the second end of the dynamic annular seal and following in the direction of air flow the first turn.

The dynamic annular seal may have an axial extent L, said first turn extending axially between −L/2 and L where the origin is taken at the first axial end of the seal and the positive direction is taken from the first end towards the second end.

Said annular part can be connected to the fuel outlet means which comprise a plurality of fuel outlet ports in the spray chamber.

Said fuel outlet means may comprise one or more circumferentially extending ducts connected upstream to said annular part.

The annular face of the rail may be a radially outer annular face, said annular part of the internal fuel circuit being arranged radially within said radial annular face.

According to another feature, said annular fuel flow part may be arranged radially inside or radially outside the dynamic annular seal.

The dynamic annular seal may comprise annular teeth which are axially spaced from each other, the annular teeth being carried by one of the fuel supply rail and the injection wheel and being adapted to frictionally engage an abradable annular part of the other of the injection wheel and the fuel supply rail.

Said radial annular part may be arranged radially inside or outside the annular teeth.

This invention also concerns a turbo machine comprising a device such as described above.

BRIEF DESCRIPTION OF THE FIGURES

FIG. 1 is a general diagram of a turbo machine with an injection wheel "14" integrated with the engine axis "12" and an annular combustion chamber "18", and FIG. 2 is a schematic representation of the operating principle of a gas turbine equipped with a fuel injection wheel, FIG. 3 represents a first embodiment according to the present disclosure, this figure comprising two parts A and B noted respectively as FIG. 3A and FIG. 3B showing respectively an axial section and an external view of the rail, the arrows illustrating schematically the fuel flow, FIG. 4 is a 3D representation of an alternative embodiment of FIG. 3 (oblong cross-section of the internal fuel circuit), FIG. 5 represents a second embodiment according to the present disclosure, this figure comprising two parts A and B noted respectively FIG. 5A and FIG. 5B, presenting respectively an axial section (part A) and an external view of the rail (part B), the arrows schematically representing the fuel flow, FIG. 6 shows a third embodiment, with an axial section (the red rectangle schematically represents a cavity where fuel can flow), FIG. 7 represents a fourth embodiment according to the present disclosure, this figure comprising two parts A and B noted respectively as FIG. 7A and FIG. 7B showing respectively an axial section and an external view of the rail, the arrows representing schematically the fuel flow.

DETAILED DESCRIPTION

Reference is now made to FIG. 3 which shows a fuel supply rail 28 intended to cooperate with an injection wheel 14 identical or similar to that shown in FIG. 2. The fuel supply rail 28 comprises an internal fuel circuit 30 with fuel outlet means 32 supplying fuel to a spray chamber. The internal fuel circuit is symbolised by a bold line and the direction of flow by arrows. The fuel outlet means 32 comprises an annular duct 32b which may not extend through 360°, this duct being connected to fuel outlet ports 32a which are evenly spaced around the axis of the turbomachine. The annular duct 32b comprises a first circumferential duct 32b1 and a second circumferential duct 32b2. The internal fuel circuit 30 is schematically shown in FIG. 3B.

The fuel supply rail 28 comprises a radially outer annular face 34 from which radial annular teeth or tongues 26a extend destined to cooperate with a ring made of abradable material (not shown). The dynamic seal so formed comprises a first end 36 and a second end 38, the second end 38 being arranged at the vicinity of the fuel outlet means 32 while the first end 36 is located opposite.

In order to avoid coke formation at the first end, the internal fuel circuit 30 comprises an annular fuel flow part 40 which is formed right at the dynamic annular seal 26, i.e. axially at the dynamic annular seal 26 and in this case radially inside the dynamic annular seal 26 (schematically the internal fuel circuit is shown with a circular cross-section, but an oblong cross-section is also possible, as shown in FIG. 4). More specifically, this annular fuel flow part 40 is formed by a first turn whose upstream end is connected to a fuel supply channel 42 and whose downstream end is connected to the annular fuel flow part 40 or first turn. It can be seen that the connection between the downstream end of the first turn 46 and the annular duct 32b is made at an angle substantially in the middle of the latter in order to reduce the pressure losses in the annular duct. This first turn 46 is formed in the vicinity of the first end 36 of the dynamic annular seal 26. Thus, any potential fuel reflux from the spray chamber 24 does not lead to coke formation as the temperature at the annular tooth 26a of the first end 36 of the dynamic annular seal 26 is reduced compared to the prior art.

FIG. 4 shows a three-dimensional view of the fuel supply rail 44 according to an alternative embodiment to that shown in FIG. 3. In this view, the first turn 46 has an axial or longitudinal dimension (i.e. an oblong and not circular cross-section), i.e. along the axis of the gas turbine. In this case, with the dynamic annular seal 26 having an axial extent L, the first turn 46 lies axially between −L/2 and L where the origin is taken at the first axial end 36 of the dynamic annular seal 26 and the positive direction is taken from the first end 36 towards the second end 38. This first turn 46 extends axially upstream from the first end 36 of the dynamic annular seal 26 to its downstream end.

FIG. 5A is a second embodiment of a fuel supply rail 48 in which the annular fuel flow part 50 comprises a first turn 50a which is connected in the airflow direction downstream to a second turn 50b, this second turn 50b being formed radially within the dynamic annular seal 26. The downstream end of the second turn 50b is connected to the fuel outlet means 32. As before, the connection between the downstream end of the second turn 50b and the annular duct 32b is made at an angle substantially in the middle of the latter to reduce pressure losses in the duct.

In operation, the fuel flows through the first turn 50a and then through the second turn 50b and then simultaneously through the first circumferential duct 32b1 and the second circumferential duct 32b2, as illustrated in FIG. 5B. In this second embodiment, it is understood that the first turn 50b1 and the second turn 50b2 together form the annular fuel flow part 50 for reducing the temperature of the dynamic annular seal 26.

FIG. 6 shows a third embodiment of a fuel supply rail 52 in which the cooling annular part 54 of the dynamic annular seal 26 is formed by an axial extension, radially within the dynamic annular seal 26, of a portion of the annular fuel outlet means 32.

FIG. 7 shows a fourth embodiment of a fuel supply rail 56 in which the downstream end of the fuel supply channel 42 is connected at a midpoint 58 of an annular duct 60 comprising a first circumferential duct 60a and a second circumferential duct 60b which, in operation, forms a cooling annular part of the dynamic annular seal 26. The downstream end of the first circumferential duct 60a is connected to a third circumferential duct 62 extending circumferentially to the midpoint 58. The downstream end of the second circumferential duct 60b is connected to a fourth circumferential duct 64 extending circumferentially to the midpoint 58.

It is understood that the downstream ends of the first 60a and second 60b circumferential ducts do not communicate with each other. In operation, the fuel flows through the fuel supply channel 42 and then splits into a first stream of fuel in the first circumferential duct 60a and then in the third circumferential duct 62 and into a second stream of fuel which flows in the circumferential duct 60b and then in the fourth circumferential duct 64.

The invention claimed is:

1. A device for supplying fuel to a combustion chamber of a gas generator, comprising:
   an injection wheel (14) for injecting fuel into the combustion chamber (18);
   a fuel supply rail (20) comprising an internal fuel circuit (30) comprising fuel outlet means (32) supplying fuel to an annular spray chamber (24) formed between the fuel supply rail (28, 44, 48, 52, 56) and the injection wheel (14); and
   at least one dynamic annular seal (26) adapted to provide a seal between an annular face (34) of the fuel supply rail (28, 44, 48, 52, 56) and the injection wheel (14);
   wherein the internal fuel circuit (30) of the fuel supply rail comprises an annular fuel flow part (40, 50) arranged radially at the dynamic annular seal (26).

2. The device according to claim 1, wherein said annular fuel flow part (40, 50) comprises at least a first turn (46, 50a) arranged radially inside the dynamic seal (26) and being connected downstream to the fuel outlet means (32).

3. The device according to claim 2, wherein said first turn (46, 50a) is formed in a vicinity of a first axial end (36) of the dynamic seal, said first axial end being arranged along the seal (26) opposite to a second end (38) arranged in a vicinity of the fuel outlet means (32).

4. The device according to claim 2, wherein said annular fuel flow part (50) comprises at least one second turn (50b) arranged axially between the first turn (50a) and the second end (38) of the dynamic annular seal (26) and fluidly following the first turn (50a).

5. The device according to claim 3, wherein the dynamic annular seal (26) has an axial extent L, said first turn (46) extends axially between −L/2 and L where the origin is taken at the first axial end of the seal and the positive direction is taken from the first end towards the second end.

6. The device according to claim 1, wherein said annular fuel flow part is connected to the fuel outlet means (32) which comprise a plurality of fuel outlet ports (32a) in the annular spray chamber (24).

7. The device according to claim 6, wherein said fuel outlet means (32) comprise one or more circumferentially extending ducts (32b1, 32b2, 62, 64) connected upstream to said annular part.

8. The device according to claim 1, wherein the annular face (34) of the fuel supply rail is a radially outer annular face, said annular part of the internal fuel circuit (30) being arranged radially inside said radial annular face (34).

9. The device according to any of the preceding claims-claim 1, wherein said annular fuel flow part (40, 50) is arranged radially inside or radially outside the dynamic annular seal (26).

10. The device according to claim 1, wherein the dynamic annular seal (26) comprises annular teeth which are axially spaced from each other, said annular teeth being carried by one of the fuel supply rail (20) and the injection wheel (14) and being adapted to frictionally engage an abradable annular part of the other of the injection wheel (14) and the fuel supply rail (20).

11. The device according to claim 10, wherein said radial annular part is arranged radially inside or outside the annular teeth.

12. A turbo machine comprising the device according to claim 1.

13. The device according to claim 4, wherein the dynamic annular seal (26) has an axial extent L, said first turn (46) extends axially between −L/2 and L where the origin is taken at the first axial end of the seal and the positive direction is taken from the first end towards the second end.

14. The device according to claim 13, wherein said annular fuel flow part is connected to the fuel outlet means (32) which comprise a plurality of fuel outlet ports (32a) in the spray chamber (24).

15. The device according to claim 14, wherein said fuel outlet means (32) comprise one or more circumferentially extending ducts (32b1, 32b2, 62, 64) connected upstream to said annular part.

* * * * *